United States Patent [19]

Benedict

[11] Patent Number: 5,013,245

[45] Date of Patent: May 7, 1991

[54] INFORMATION SHAPES

[76] Inventor: Morgan D. Benedict, 802 S. Gay St., Longmont, Colo. 80501

[21] Appl. No.: 399,426

[22] Filed: Aug. 25, 1989

Related U.S. Application Data

[63] Continuation of Ser. No. 188,679, Apr. 29, 1988, abandoned, which is a continuation of Ser. No. 876,722, Jun. 20, 1986, abandoned.

[51] Int. Cl.$^5$ .............................................. G09B 1/00
[52] U.S. Cl. .................................. 434/170; 434/171;
434/113; 434/211; 446/122; 446/126
[58] Field of Search ............... 434/403, 211, 170, 171,
434/172, 131, 113 R; 446/126, 122, 97

[56] References Cited

U.S. PATENT DOCUMENTS

| 185,889 | 1/1877 | Boorman | 434/150 |
|---|---|---|---|
| 1,446,868 | 2/1923 | Baker | 446/126 |
| 1,542,031 | 6/1925 | Bruhn | 434/172 |
| 2,482,402 | 9/1949 | Corcodilos | 434/403 |
| 2,966,832 | 8/1961 | Rusin | 446/111 |
| 3,208,162 | 9/1965 | Wisdom | 434/211 |
| 3,307,274 | 3/1967 | Glaser | 434/312 |
| 3,564,735 | 2/1971 | Fisher | 434/403 |
| 3,670,427 | 6/1972 | Stolpen | 434/172 X |
| 3,728,800 | 4/1973 | Mayram | 434/171 |
| 3,822,499 | 7/1974 | De Vos | 446/121 |
| 3,873,096 | 3/1975 | Shoptaugh | 273/156 |
| 4,047,322 | 9/1977 | Woodrow | 446/2 |
| 4,170,425 | 10/1979 | Brown | 446/126 |
| 4,258,479 | 3/1981 | Roane | 434/211 |
| 4,326,354 | 4/1982 | Hagbery | 446/95 |
| 4,443,199 | 4/1984 | Sakai | 434/170 |
| 4,478,582 | 10/1984 | Tucker | 434/170 |
| 4,522,404 | 6/1985 | Di Gregorio | 273/157 R |
| 4,613,309 | 9/1986 | McCloskey | 434/170 |
| 4,643,683 | 2/1987 | Orsini et al. | 434/403 |
| 4,650,424 | 3/1987 | Mitchell | 434/211 |
| 4,758,195 | 7/1988 | Walsh | 446/122 |

FOREIGN PATENT DOCUMENTS

| 654113 | 12/1962 | Canada | 434/172 |
|---|---|---|---|
| 874523 | 6/1971 | Canada | 273/155 |
| 2251951 | 11/1973 | Fed. Rep. of Germany | 446/124 |
| 2434365 | 1/1976 | Fed. Rep. of Germany | 446/122 |
| 2607533 | 9/1977 | Fed. Rep. of Germany | 446/111 |
| 1089076 | 3/1955 | France | 446/122 |
| 1159319 | 6/1958 | France | 446/126 |
| 2356220 | 6/1976 | France | 434/171 |
| 59636 | 1/1968 | German Democratic Rep. | 434/211 |
| 545995 | 7/1956 | Italy | 446/126 |
| 521120 | 5/1940 | United Kingdom | 446/122 |
| 81/01478 | 5/1981 | World Int. Prop. O. | 434/170 |

*Primary Examiner*—Henry E. Raduazo
*Attorney, Agent, or Firm*—Charles N. Hilke

[57] ABSTRACT

A series of interrelated solid, geometric shapes having informational - processing applications. Each solid, geometric shape may be assigned a specific meaning; additionally, any one solid, geometric shape may be assigned several specific meanings by changes of color, braille, scoring, texture, and/or tone (sound). Means for connecting different solid, geometric shapes are provided and are called connectors, which may or may not be assigned specific meanings or several meanings by changing the solid, geometric shape, color, braille, scoring, texture, and/or tone (sound). The series of interrelated solid, geometric shapes may be used for (1) physiology—fine motor coordination, visual or auditory/tactile perception, and joint hemispherical stimulation of the cerebral cortex and (2) communication—language, history, art, computer programming, computer processing (grammatical and parallel), and abstract thinking.

7 Claims, 2 Drawing Sheets

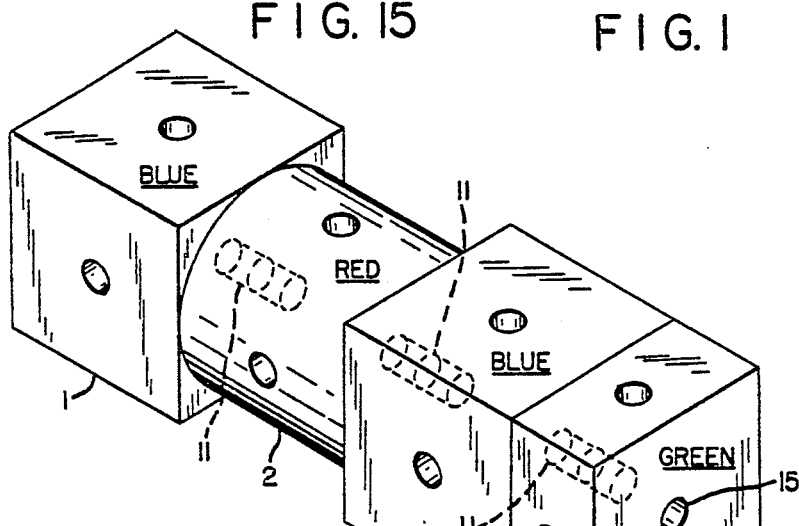
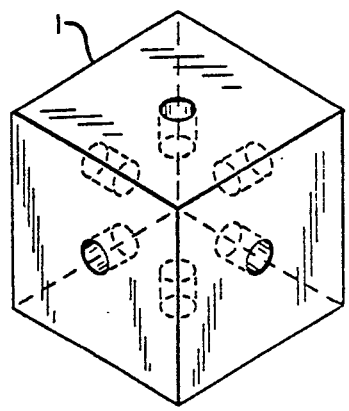
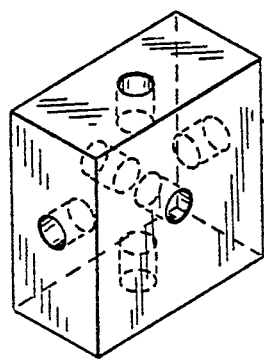
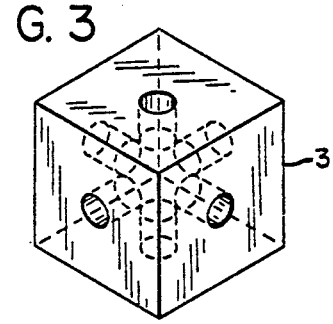
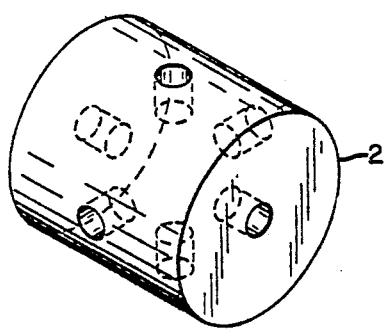
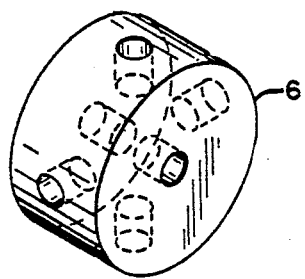
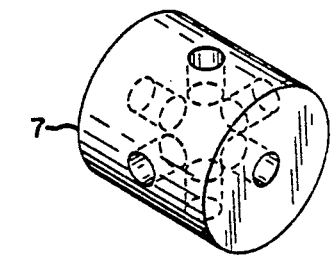
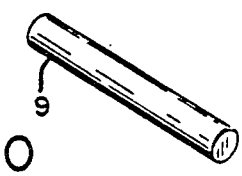
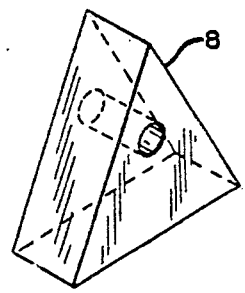

FIG. 12
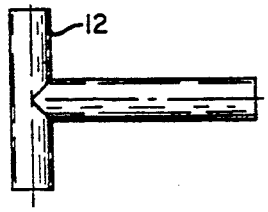
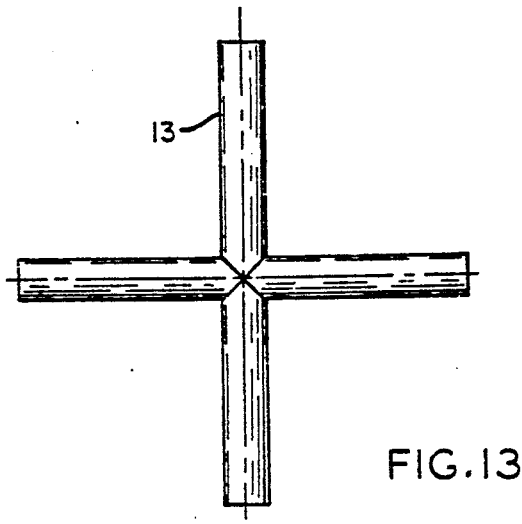
FIG. 13
FIG. 16
FIG. 14
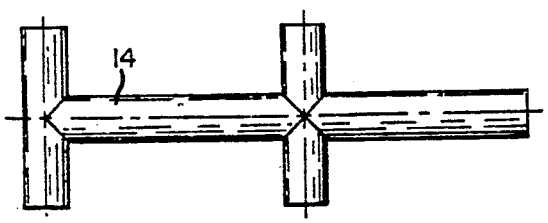
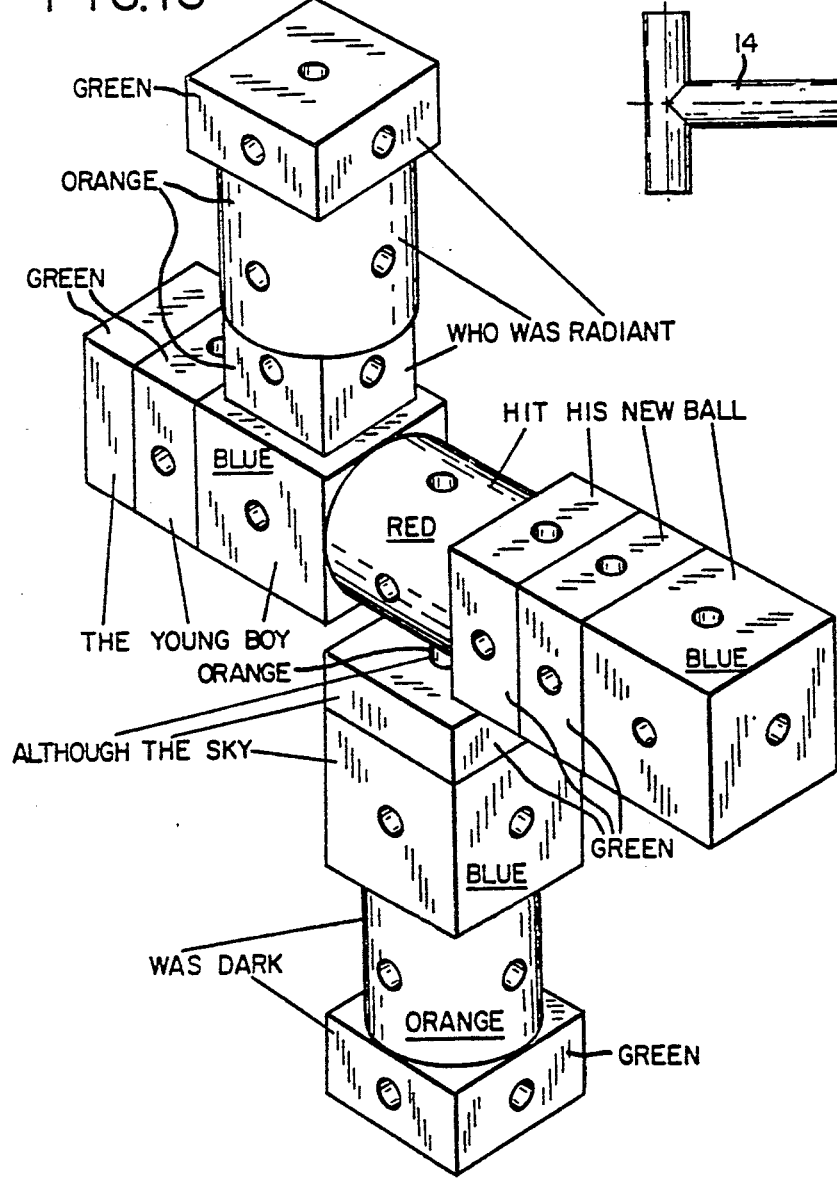

INFORMATION SHAPES

This is a continuation of co-pending U.S. application Ser. No. 188,679 filed on Apr. 29, 1988 now abandoned, which is a continuation of Ser. No. 876,722 filed on June 20, 1986 and now abandoned.

BACKGROUND OF THE INVENTION

Field of Invention

This invention relates to a series of interrelated solid, geometric shapes interconnected by solid, geometric shapes where each solid, geometric shape is assigned a specific meaning or several specific meanings as color, braille, scoring, texture, and/or tone (sound) change.

Prior Art

Using geometric shapes for educational purposes has been known in the prior art. See, for example, U.S. Pat. No. 3,726,027 which also provides for changes in color and texture. Tactile toys used in some cases for brain-damaged or blind individuals are disclosed in U.S. Pat. No. 3,564,735. Variously colored tetrahedral blocks held together magnetically can be used for educational purposes, e.g., history and architecture, as taught by U.S. Pat. No. 4,258,479. Finally, the use of many-sided geometric figures for mapping purposes is disclosed in U.S. Pat. No. 185,889.

Prior art does not disclose the use of a series of simple shapes which by changes in solid, geometric shape, color, braille, scoring, texture, and/or tone (sound) may convey complex information. Furthermore, this invention allows the use of the solid, geometric shapes in various unrelated disciplines. Finally, a three-dimensional presentation of information can be used.

SUMMARY OF THE INVENTION

A series of interrelated solid, geometric shapes where each solid, geometric shape may be assigned a specific meaning and where connectors are used to attach the same solid, geometric shapes together. Any one solid, geometric shape may be assigned several specific meanings by changes of color, braille, scoring, texture, and/or tone (sound). Additionally, the connectors may or may not be assigned specific meanings or several meanings by changing the solid, geometric shape, color, braille, scoring, texture, and/or tone (sound).

It is an object of this invention to provide a general series of solid, geometric shapes which may be used for informational-processing applications.

It is another object to provide a single series of solid, geometric shapes which may be used separately or simultaneously in several different and seemingly unrelated disciplines, for example, physiology and communication.

It is another object to reinforce learning of many different disciplines by varied uses of sight, touch, and sound.

It is another further object to be able to represent various disciplines three-dimensionally.

BRIEF DESCRIPTION OF THE DRAWINGS

FIG. 1 is a perspective view of a cube.

FIG. 2 is a perspective view of a cylinder.

FIG. 3 is a perspective view of a smaller cube.

FIG. 4 is a perspective view of a rectangular parallelopiped.

FIG. 5 is a perspective view of a smaller rectangular parallelopiped.

FIG. 6 is a perspective view of a smaller volume cylinder.

FIG. 7 is a perspective view of a smallest volume cylinder.

FIG. 8 is a perspective view of an isosceles prism.

FIG. 9 is a perspective view of a cylindrical dowel.

FIG. 10 a perspective view of a smaller cylindrical dowel.

FIG. 11 a perspective view of a smallest cylindrical dowel.

FIG. 12 is a perspective view of a dowel tee.

FIG. 13 is a perspective view of a dowel cross.

FIG. 14 is a perspective view of a dowel tee-cross.

FIG. 15 is a perspective view of a three-dimensional representation of a simple sentence.

FIG. 16 is a perspective view of a three-dimensional representation of a complex sentence.

DESCRIPTION OF PREFERRED EMBODIMENT

While the solid, geometric shapes may be used in various disciplines, the example used throughout the preferred embodiment will be the use of the solid, geometric shapes for model presentation of the English language (Syn-Tactics). For this purpose, we describe the following solid, geometric shapes and provide meanings for them:

| | |
|---|---|
| Cube 1 | Noun |
| Cylinder 2 | Verb |
| Smaller Cube 3 | Pronoun |
| Rectangular Parallelopiped 4 | Adjective |
| Smaller Rectangular Parallelopiped 5 | Article |
| Smaller Volume Cylinder 6 | Adverb |
| Smallest Volume Cylinder 7 | Verbal |
| Isosceles Prism 8 | Interjection |
| Cylindrical Dowel 9 | Conjunction |
| Smaller Cylindrical Dowel 10 | Preposition |
| Smallest Cylindrical Dowel 11 | Invisible Connector |
| Dowel Tee 12 | Conjunction |
| Dowel Cross 13 | Conjunction |
| Dowel Tee-cross 14 | Conjunction |

Most simple sentence patterns in the English language can be depicted by only two types of symbols, one of which may be repeated once or twice. Two distinct symbols are required to represent the parts of speech comprising the simplest of the simple sentence patterns; in this initial syntax, simple subject (noun)—simple predicate (intransitive verb), a noun has been given preference for simple subject over a pronoun, for a noun may be a beginning of thought in itself, but a pronoun requiring an antecedent may not, and an intransitive verb has been given preference for simple predicate over a transitive verb or a linking verb, for an intransitive verb by definition does not require a direct object or a subject complement. Three symbols, two of which are identical, are needed to represent another simple sentence pattern which is an extension of the first, simple subject (noun)—simple predicate (transitive verb)—direct object (noun). Comparison of this latter syntax with the former pattern illustrates that the distinction between an intransitive and a transitive verb is only a matter of context, omission or addition of a direct object to receive the action of the verb, not of verb form; therefore, the same symbol for both intransitive and transitive verbs will suffice. Consequentially, an additional but not new symbol is needed for two other simple sentence patterns, simple subject (noun)—simple predicate (transitive verb)—direct object (noun)—object complement (noun) and simple subject (noun)—simple predicate (transitive verb)—indirect object (noun)—direct object (noun).

An exceptional simple sentence pattern can also be depicted by only two of the same types of symbols, one of which must be repeated once. In this peculiar syntax, simple subject (noun)—simple predicate (linking verb)—subject complement (noun), a distinction has been made between the previously mentioned action verbs and a linking verb. Comparison of this latter syntax with the former patterns illustrates that the distinction between an action verb (intransitive or transitive) and a linking verb is both a matter of context, omission or addition of either a direct object or a subject complement, and verb form, expression of action or existence; therefore, the same symbol without modification for both action and linking verbs will not suffice. (Note: object and subject complements as adjectives or adverbs have been assigned the same forms as other adjectives or adverbs, including verbals, which are discussed elsewhere.)

Two solid, geometric shapes, which are perceptively different in form from each other, have been selected to individually represent the noun and the verb (action and linking). The cube 1, possessing rectilinear characteristics, shall typify the noun; the cylinder 2, possessing curvilinear characteristics (in nonperpendicular perspective), shall typify the verb. The two shapes are considered compatible for modeling or graphing purposes, because any of the six sides of a cube 1 may be interfaced with or attached to either end of a cylinder 2 when the width of the cube 1 corresponds to the diameter of the cylinder 2.

The aforementioned cube 1 (noun) has been arbitrarily coded blue.

The same cube 1 has not been brailled or scored; delineation or distinction for the purpose of subclassification of the noun has not been deemed necessary.

The aforementioned cylinder 2 (verb) has been coded by two different colors for the purpose of subclassification. The action verb has been arbitrarily coded red; the linking verb has been arbitrarily coded orange. (Note: those parts of speech having as their dominant function to connect other parts of speech rather than to be modified or to modify shall be discussed in Syn-Tactics as elements of Linkage and uniformly coded orange. Those elements shall respectively include linking verb, Linking Pronoun or relative pronoun, Linking Adverb or conjunctive adverb, Invisible Connector, and Visible Connectors—preposition, coordinating conjunction, correlating conjunction, and subordinating conjunction.)

The same cylinder 2 may be brailled to delineate for the visually handicapped those alternative forms of the verb. The action verb should then be labeled A, and the linking verb should then be labeled L, first-letter representations of their subclassifications.

Modification of the dimensions of the cube 1 is necessary to distinguish between a noun and a pronoun. The pronoun shall retain the shape of a cube but in lesser proportion, for the pronoun's antecedent in grammatical function is always or eventually a noun, usually having greater informative capability, and, therefore, it seems appropriate that the pronoun's antecedent in physical form should also be larger.

The smaller cube 3 (pronoun) has been coded by six different colors for the purpose of subclassification. The personal pronoun has been coded yellow, a color symbolically associated with warmth or a positive, intimate relationship. The reflexive pronoun has been coded brown, an intensive shade of yellow for an intensive form of the personal pronoun. The interrogative pronoun has been coded white, for it has been figuratively assumed that all pure questions are meant to enlighten the darkness of the unknown. The Linking Pronoun or relative pronoun has been coded orange, a color already associated with Linkage in Syn-Tactics. The demonstrative pronoun has been coded black, a color symbolically associated with the evil of a demon. The indefinite pronoun has been coded grey, for it has been assumed that the etiology of the indefinite pronoun is as vague as the figurative meaning of the color.

The same smaller cube 3 may be brailled to delineate for the visually handicapped those alternative forms of the pronoun. One-letter representations of those subclassifications should then be used: personal (P), reflexive (X), interrogative (questioning--Q), Linking (relative--T), demonstrative (D), and indefinite (vague--V). (Note: an alternative to first-letter representation of some pronoun subclassifications has been chosen because of the confusion which would otherwise result from duplication of associations.)

The adjective as principal modifier of the noun shall be represented by a rectangular parallelopiped 4. In comparison to the noun, the adjective's shared rectilinear characteristics, identical width but lesser length, consequentially enable either end of the rectangular parallelopiped to be interfaced with any side of the cube 1. The adjective's lesser length is also intended to suggest its dependent role as a modifier.

The previously mentioned rectangular parallelopiped 4 (adjective) has been arbitrarily coded green.

The same rectangular parallelopiped 4 may be scored to distinguish for both the visually handicapped and the normal between comparative forms of the adjective. The positive form should then be labeled 0 (zero) to indicate the absence of comparison; the comparative form should then be labeled 2 (two) to indicate that two nouns are being compared; the superlative form should then be labeled 3 (three) to indicate that three or more nouns are being compared.

The article has been interpreted to be a weak relative of the adjective. Again, as a singular or companion witness (with an adjective) to the noun, the article, indefinite or definite, shall retain the shape of a rectangular parallelopiped, too; however, the article possesses only a marginal fraction of the adjective's informative capability; therefore, the article, while keeping the same width as the adjective and noun in order to maintain its interfacing function with either or both, has been further reduced in length to indicate that previously mentioned lesser informative capability.

The latter smaller rectangular parallelopiped 5 (article) has been coded a tint of green, for the article does provide some lightly weighted, descriptive information regarding specificity.

The same smaller rectangular parallelopiped 5 may be either brailled to delineate for the visually handicapped or scored to distinguish for the normal between alternative forms of the article. The indefinite forms (a, an) should then be labelled I, and the definite form (the) should then be labeled D, first-letter representations of their subclassifications.

Modification of the dimensions of the cylinder 2 is necessary to distinguish between a verb and a verbal. The verbal shall retain the shape of a cylinder but in lesser proportion, both diameter and length, for a verbal by definition maintains verb form but not function, usually being a verb part, and, therefore, it seems appropriate that the verb whole in physical form should also be larger.

The smallest volume cylinder 7 (verbal) has been coded by three different colors for the purpose of subclassification. The gerund has been coded blue, for it grammatically functions as a noun which already has been assigned the same color. The participle has been coded green, for it grammatically functions as an adjective which already has been assigned the same color. The infinitive has been coded purple, for it may grammatically function as either a noun, an adjective, or an adverb but shall be distinguishable for its last capability as an adverb which is to be assigned the same color.

The same smallest volume cylinder 7 may be brailled to delineate for the visually handicapped those alternative forms of the verbal. First-letter representations of those subclassifications should then be used: gerund (G), participle (P), and infinitive (I).

The adverb as principal modifier of the verb, as well as intensive modifier of some adjectives and other adverbs, shall be represented by a cylinder, too. In comparison to the verb, the adverb's shared rectilinear characteristics (in perpendicular perspective), identical diameter but lesser length, consequentially enable either end of the smaller volume cylinder 6 to be interfaced with either end of the cylinder 2. In comparison to the adjective, the adverb's shared rectilinear characteristics (in perpendicular perspective), identical width (diameter) and length, consequentially enable either end of the smaller volume cylinder 6 to be interfaced with either end of the rectangular parallelopiped 4. The adverb's identical length is also intended to suggest its codependent role as a principal modifier.

The previously mentioned smaller volume cylinder 6 (adverb) has been coded by two different colors for the purpose of subclassification. The regular adverb has been arbitrarily coded purple; the Linking Adverb or conjunctive adverb has been coded orange, a color already associated with Linkage in Syn-Tactics.

The same smaller volume cylinder 6 may be brailled to delineate for the visually handicapped those alternative forms of the adverb. The Linking Adverb should then be labeled L, a first-letter representation of its subclassification. (Note: the regular adverb need not be labeled, for it shall be distinctively scored.)

The same smaller volume cylinder 6 may be scored also to distinguish for both the visually handicapped and the normal between comparative forms of the regular adverb. The positive form should then be labeled 0 (zero) to indicate the absence of comparison; the comparative form should then be labeled 2 (two) to indicate that two nouns are being compared; the superlative form should then be labeled 3 (three) to indicate that three or more nouns are being compared.

The interjection has been interpreted to be a grammatical anachronism, a prehistoric sound having frequently uncertain, cognitive meaning in a modern linguistic world which has otherwise since evolved. The interjection has been assigned the unique form of an isosceles prism 8 to suggest its caret-like adaptability to any syntax, beginning or end, or assertive independence in spite of context.

The aforementioned prism 8 (interjection) has been coded grey, for it has been assumed that the etiology of the interjection is as vague as the origin(s) of the indefinite pronoun; therefore, both share the same color.

The same prism 8 has not been brailled or scored; delineation or distinction for the purpose of subclassification of the interjection has not been deemed necessary.

Syn-Tactical Union between any combination of the previously mentioned solid, geometric shapes—cube 1, cylinder 2, smaller cube 3, rectangular parallelopiped 4, smaller rectangular parallelopiped 5, smaller volume cylinder 6, smallest volume cylinder 7, and isosceles prism 8—may be invisible or visible. If the purpose of the connection is to maintain the physical integrity of the model or graph, then the connector shall be invisible or so indicated by broken lines. If the purpose of the connection is to establish the grammatical integrity of the model or graph, then the connector shall be visible or so indicated by solid lines.

Six additional, solid, geometric shapes, which are also perceptively different in form from each other, have been selected to individually represent the Invisible and/or Visible Connectors. A cylindrical dowel 9, smaller cylindrical dowel 10, or smallest cylindrical dowel 11 shall be used, horizontally or vertically (−/|), for simple, one-to-one, connections; a dowel tee (├─) 12 and dowel cross (─┼─) 13 shall be used respectively for compound, one-to-two or two-to-two, connections; a dowel tee-cross (┤├) 14 shall be used for double-compound, two-to-three, connections. (Note: the dowel tee (├─), dowel cross (─┼─), and dowel tee-cross (┤├) formations may be derivatives of the simpler cylindrical dowel (−/|) formations.)

The Invisible Connector shall be solely represented by the smallest cylindrical dowel 11. The same connector shall only be employed on either an x- or a y-axis, depending on the specific sentence structure. For example, the smallest cylindrical dowel 11 may be used horizontally to join a simple subject (cube 1) to a simple predicate (cylinder 2), or the same connector may be used vertically to join a simple predicate (cylinder 2) to an indirect object (smaller cube 3).

The previously mentioned smallest cylindrical dowel 11 (Invisible Connector) has been arbitrarily coded orange and black, one of the colors (orange) already associated with Linkage in Syn-Tactics.

The same smallest cylindrical dowel 11 has not been brailled or scored; delineation or distinction for the purpose of subclassification of the Invisible Connector has not been deemed necessary.

The preposition as Visible Connector of adjective and adverb phrases shall be represented by the smaller cylindrical dowel 10. The same connector shall only be employed on either a y- or a z-axis, depending on axis availability. For example: a Linking Pronoun or a subordinating conjunction (with dependent clause) shall have y-axis priority over a preposition (with adjective or adverb phrase); a coordinating or correlating conjunction (with independent clauses on parallel x-axes) shall have z-axis priority over a preposition (with adjective or adverb phrase). In comparison to the same type of Invisible Connector, the preposition's shared rectilinear characteristics, identical diameter but double length, consequentially enable either end of the smaller cylindrical dowel 10 to be united with almost any cube, cylinder, or rectangular parallelopiped, one half of the connector's length remaining visible for the purpose of revealing its identity.

The conjunction as Visible Connector of independent and dependent clauses shall be represented by the cylindrical dowel 9, dowel tee 12, dowel cross 13, and dowel tee-cross 14. The cylindrical dowel 9 shall only be employed horizontally on an x-axis if coordinating or correlating individual parts of speech or on a z-axis if coordinating or correlating independent clauses, or the same connector shall only be employed vertically on a y-axis if subordinating dependent (noun and adverb) clauses. (Note: the orange, smaller cube 3 shall also be employed on a y-axis if subordinating other dependent (noun and adjective) clauses.) The dowel tee 12, dowel cross 13, and dowel tee-cross 14 shall only be employed on the x-axis/axes, depending on specific sentence structure. For example: a conjunction (dowel tee 12) may be used to join a compound simple subject (two cubes 1) to a simple predicate (cylinder 2), or the same connector may be used to join a simple subject (cube 1) to a compound simple predicate (two cylinders 2), if either or both of the verbs are intransitive; a conjunction (dowel cross 13) may also be used to join a simple subject (smaller cube 3) to a compound simple predicate (two cylinders 2), if both of the verbs are transitive, i.e., have the same direct object; a conjunction (dowel tee-cross 14) may be used to join a compound simple subject (two smaller cubes 3) to a compound simple predicate (two cylinders 2), whether the verbs are intransitive or transitive. In comparison to the same type of Invisible Connector, the conjunction's shared rectilinear characteristics, identical diameter but triple (or greater) width and/or length, consequentially enable either end of the cylindrical dowel 9 or any of its derivatives—dowel tee 12, dowel cross 13, or dowel tee-cross 14—to be united with almost any cube, cylinder, or rectangular parallelopiped, two-thirds of the formation's width and/or length remaining visible for the purpose of revealing its identity.

The previously mentioned formations—smaller cylindrical dowel 10 (preposition) and cylindrical dowel 9, dowel tee 12, dowel cross 13, and dowel tee-cross 14 (conjunctions)—have been coded orange, a color already associated with Linkage in Syn-Tactics.

The cylindrical dowel 9 (conjunction) may be scored to distinguish for both the visually handicapped and the normal between those alternative forms of the conjunction used on an x- or a z-axis. The coordinating form should then be labeled / (one diagonal slash) to indicate that one word is being used; the correlating form should then be labeled // (two parallel, diagonal slashes) to indicate that two or more separated words are being used. (Note: the subordinating form need not be labeled, for it shall be distinctively employed on a y-axis.)

FIG. 15 shows in perspective a simple sentence pattern, simple subject (noun)—simple predicate (transitive verb)—direct object (noun)—object complement (adjective). Three smallest cylindrical dowels 11 (Invisible Connectors) are used to join other solid, geometric shapes to form the model. Notice that the model is color-coded in addition to the indicia shown on the nouns, verb, and adjective. Of course, in place of the indicia, the shapes could be textured. Finally, while solid, geometric shapes have been used, the same solid, geometric shapes may be made hollow, so that each shape would have a different tone (sound). Thus, distinctive auditory perception is available.

FIG. 16 shows in perspective a complex sentence pattern: "Although the sky was dark, the young boy who was radiant hit his new ball." The color of each solid, geometric shape, indicia where necessary, and representation for each word are also shown. Notice that the adverb clause, which is subordinate, is positioned downward; the adjective clause could be located either up or down but is most clearly shown above the noun "boy." All connectors are Invisible Connectors, except the Visible Connector (conjunction) which represents the word "Although".

While the specific embodiment is used as an example, the modeling of the English language, it is clear that other subject matter could be similarly represented. The device is an informational device requiring only perceptible differences in shape; thus, there is no requirement that any shape be an ordinary solid, geometric shape. In fact, a computerized version, perceptible on a screen, color-coded with electronically controlled sound, can represent the solid, geometric shapes. Further, the informational device may be used to represent three-dimensional, computer-processing architecture.

Through means of appropriate software, the geometrical shapes may be portrayed on a monitor or t.v. screen as is common in that art. The coloring of the physical blocks may be done by painting the blocks or forming the blocks of colored material. The color in the electronic representation is controlled, as is common in the industry by the software so that different colors may be presented on the monitor. In the electronic presentation, the software again can control the distinctive sounds emitted by each shape. The sounds produced are common in the industry. In the physical presentation of the shapes, the sound may be produced striking the hollow shape or producing the shapes of different materials which will produce different sounds when struck.

As can readily be seen, a set of thirteen shapes with one additional shape are used to construct the information device when used as a model for representing the parts of speech of the English language. The first set is a cube presenting nouns. The second set is a cylinder representing verbs. The third set is a smaller cube representing pronouns. The fourth set is a rectangular parallelopiped representing adjectives. The fifth set is a smaller rectangular parallelopiped representing articles. The sixth set is a smaller volume cylinder representing adverbs. The seventh set is the smallest volume cylinder representing verbals. The eighth set is an isosceles prism representing interjections. The ninth set is a cylindrical dowel representing conjunctions. The tenth set is a smaller cylindrical dowel representing prepositions. The eleventh set is a dowel tee representing conjunctions. The twelfth set is a dowel cross representing conjunctions. The thirteenth set is a dowel tee-cross representing conjunctions. The fourteenth set is a smalles cylindrical dowel which does not represent any part of speech.

Additionally within each set, different colors, sounds, or tactical indicia may be used to distinguish within each set.

Many variations, modifications, and applications will occur to those skilled in this art, and all such are deemed to fall within the spirit and scope of my invention as defined in the following claims.

I claim:

1. An information device comprising:
   (a) a series of three-dimensional geometric shapes representing parts of speech comprising:

a cube,
a cylinder,
a smaller cube,
a rectangular parallelopiped,
a smaller rectangular parallelopiped,
a smaller volume cylinder,
a smallest volume cylinder,
a isosceles prism,
a cylindrical dowel,
a smaller cylindrical dowel,
a smallest cylindrical dowel,
a dowel tee,
a dowel cross, and,
a dowel tee-cross; and
  (b) means for connecting each geometric shape to every other geometric shape comprising at least one hole in each said geometric shape within which a dowel is fitted.

2. The smallest cylindrical dowel of claim 1 where said dowel is not visible when connecting one geometrical shape to another.

3. The cylindrical dowel and smaller cylindrical dowel of claim 1 where said dowel is visible when connecting one geometrical shape to another.

4. The informational device of claim 1 where each said geometric shape is color-coded.

5. The information device of claim 1 where each said geometric shape contains distinguishable indicia.

6. The educational device of claim 1 where each said geometric shape contains a hollow volume which when activated produces distinct tones.

7. An informational device for model representation of parts of speech of the English language comprising:
  a. A first set, comprised of a cube, representing a noun with said element being further identified by a first color scheme;
  b. A second set, comprised of a cylinder, representing a verb with said element being further identified by a second and third color scheme;
  c. A third set, comprised of a smaller cube, representing a pronoun with said element being further identified by a third, a fourth, fifth, sixth, seventh, and eighth color scheme;
  d. A fourth set, comprised of a rectangular parallelopiped, representing an adjective with said element being further identified by a ninth color scheme;
  e. A fifth set, comprised of a smaller rectangular parallelopiped, representing articles with said element being further identified by an tenth color scheme;
  f. A sixth set, comprised of a smaller volume cylinder, representing adverbs with said element being further identified by a third and eleventh color scheme;
  g. A seventh set, comprised of a smallest volume cylinder, representing verbals with said element being further identified by a first, ninth, and eleventh color scheme;
  h. An eighth set, comprised of an isosceles prism, representing interjections with said element being further identified by an eighth color scheme;
  i. A ninth set, comprised of a cylindrical dowel, representing conjunctions with said element being further identified by a third color scheme;
  j. A tenth set, comprised of a smaller cylindrical dowel, representing prepositions with said element being further identified by a third color scheme;
  k. An eleventh set, comprised of a dowel tee, representing conjunctions with said element being further identified by a third color scheme;
  l. A twelfth set, comprised of a dowel cross, representing conjunctions with said element being further identified by a third color scheme;
  m. A thirteenth set, comprised of a dowel-tee cross, representing conjunctions with said element being further identified by a third color scheme; and
  n. A fourteenth set, comprised of a smallest cylindrical dowel, which does not represent any part of speech.

* * * * *